US012806713B2

(12) United States Patent
Weston et al.

(10) Patent No.: US 12,806,713 B2
(45) Date of Patent: Nov. 24, 2026

(54) LASER BEAM SCANNER

(71) Applicant: RENISHAW PLC, Wotton-under-Edge (GB)

(72) Inventors: Nicholas John Weston, Peebles (GB); Geoffrey Mcfarland, Wickwar (GB)

(73) Assignee: RENISHAW PLC, Wotton-under-Edge (GB)

( * ) Notice: Subject to any disclaimer, the term of this patent is extended or adjusted under 35 U.S.C. 154(b) by 848 days.

(21) Appl. No.: 17/050,630

(22) PCT Filed: May 15, 2019

(86) PCT No.: PCT/EP2019/062460
§ 371 (c)(1),
(2) Date: Oct. 26, 2020

(87) PCT Pub. No.: WO2019/219739
PCT Pub. Date: Nov. 21, 2019

(65) Prior Publication Data

US 2021/0229215 A1 Jul. 29, 2021

(30) Foreign Application Priority Data

May 15, 2018 (GB) ...................................... 1807830

(51) Int. Cl.
*B23K 26/082* (2014.01)
*B22F 10/28* (2021.01)
(Continued)

(52) U.S. Cl.
CPC .......... *B23K 26/082* (2015.10); *B22F 10/366* (2021.01); *B22F 12/44* (2021.01);
(Continued)

(58) Field of Classification Search
CPC .......... B33Y 30/00; B33Y 10/00; B33Y 50/00
See application file for complete search history.

(56) References Cited

U.S. PATENT DOCUMENTS 5,155,324 A * 10/1992 Deckard ................ B29C 41/46
219/121.64
5,508,489 A 4/1996 Benda et al.
(Continued)

FOREIGN PATENT DOCUMENTS

CN 104551387 A * 4/2015 ......... B23K 26/0081
DE 10 2006 004 085 A1 8/2007
(Continued)

OTHER PUBLICATIONS

Choudhury, Towards freeform microlens arrays for near infrared astronomical instruments, Jul. 18, 2014, SPIE, https://www.spiedigitallibrary.org/conference-proceedings-of-spie/9151/1/Towards-freeform-microlens-arrays-for-near-infrared-astronomical-instruments/10.1117/12.2056479.full?SSO=1 (Year: 2014).*
(Continued)

*Primary Examiner* — Woody A Lee, Jr.
*Assistant Examiner* — Franklin Jefferson Wang
(74) *Attorney, Agent, or Firm* — Oliff PLC

(57) ABSTRACT

A laser beam scanner including a laser beams positioning optic, a plurality of optical fibres for delivering a plurality of laser beams and a fibre termination optic aligned to direct the laser beams from output ends of the plurality of optical fibres to the laser beams positioning optic. The laser beams positioning optic is movable relative to the fibre termination optic to scan the laser beams across a working surface.

4 Claims, 11 Drawing Sheets

(51) Int. Cl.

| | |
|---|---|
| ***B22F 10/366*** | (2021.01) |
| ***B22F 12/44*** | (2021.01) |
| ***B22F 12/45*** | (2021.01) |
| ***B22F 12/49*** | (2021.01) |
| ***B23K 26/042*** | (2014.01) |
| ***B29C 64/135*** | (2017.01) |
| ***B33Y 30/00*** | (2015.01) |

(52) U.S. Cl.

CPC ............ *B22F 12/49* (2021.01); *B23K 26/042* (2015.10); *B29C 64/135* (2017.08); *B22F 10/28* (2021.01); *B22F 12/45* (2021.01); *B33Y 30/00* (2014.12)

(56) References Cited

U.S. PATENT DOCUMENTS

| | | | | |
|---|---|---|---|---|
| 5,862,278 | A * | 1/1999 | Brauch .............. | B23K 26/0613 385/35 |
| 7,982,957 | B2 | 7/2011 | Takeuchi et al. | |
| 10,399,179 | B2 * | 9/2019 | Harding ................. | B33Y 10/00 |
| 10,399,183 | B2 | 9/2019 | Dallarosa et al. | |
| 2003/0028278 | A1 * | 2/2003 | Darrah .................. | B29C 64/153 264/308 |
| 2003/0117482 | A1 * | 6/2003 | Border ............... | B23K 26/0648 347/224 |
| 2003/0214571 | A1 | 11/2003 | Ishikawa et al. | |
| 2004/0240813 | A1 | 12/2004 | Koyagi | |
| 2006/0065640 | A1 * | 3/2006 | Lizotte .................. | H01S 3/0057 219/121.61 |
| 2007/0221639 | A1 | 9/2007 | Yoshikawa | |
| 2012/0045169 | A1 * | 2/2012 | Hu ...................... | G02B 6/29311 385/115 |
| 2014/0076870 | A1 * | 3/2014 | Hirano ................... | B23K 26/38 219/121.75 |
| 2014/0242400 | A1 * | 8/2014 | Hoebel ..................... | B22F 7/06 219/121.17 |
| 2014/0271328 | A1 * | 9/2014 | Burris .................. | B23K 26/034 419/53 |
| 2015/0139587 | A1 | 5/2015 | Kozak et al. | |
| 2015/0165556 | A1 | 6/2015 | Jones et al. | |
| 2016/0114427 | A1 | 4/2016 | Eibl et al. | |
| 2016/0279706 | A1 * | 9/2016 | Domrose ................ | B22F 10/28 |
| 2016/0279707 | A1 | 9/2016 | Mattes et al. | |
| 2016/0322777 | A1 * | 11/2016 | Zediker ................. | H01S 5/4062 |
| 2017/0021454 | A1 | 1/2017 | Dallarosa et al. | |
| 2017/0021455 | A1 * | 1/2017 | Dallarosa ................ | B22F 10/28 |
| 2018/0259732 | A1 | 9/2018 | Pontiller-Schymura | |
| 2019/0118289 | A1 * | 4/2019 | Usami .................. | B23K 26/082 |
| 2019/0126413 | A1 * | 5/2019 | Bogdan, Jr. ............. | B22F 10/28 |
| 2020/0180066 | A1 * | 6/2020 | Vorontsov .......... | B23K 26/0676 |

FOREIGN PATENT DOCUMENTS

| | | | |
|---|---|---|---|
| JP | S61-162292 | A | 7/1986 |
| JP | H04-327391 | A | 11/1992 |
| JP | 2002-287059 | A | 10/2002 |
| JP | 2003-340923 | A | 12/2003 |
| JP | 2008-145734 | A | 6/2008 |
| JP | 2011-043808 | A | 3/2011 |
| JP | 2015-072955 | A | 4/2015 |
| KR | 10-2011-0006448 | A | 1/2011 |
| WO | 2014/125258 | A2 | 8/2014 |
| WO | 2014/125280 | A2 | 8/2014 |
| WO | 2016/079496 | A2 | 5/2016 |
| WO | 2016/156824 | A1 | 10/2016 |
| WO | 2016/201326 | A1 | 12/2016 |
| WO | 2018/138490 | A1 | 8/2018 |
| WO | 2019/063999 | A1 | 4/2019 |

OTHER PUBLICATIONS

CN-104551387-A (Wang, Hongcai) Apr. 29, 2015 [retrieved on May 14, 2024]. Retrieved from Espacenet Database, translation by EPO and Google. (Year: 2015).*

Aug. 12, 2019 Search Report issued in International Patent Application No. PCT/EP2019/062460.

Aug. 12, 2019 Written Opinion of the International Searching Authority issued in International Patent Application No. PCT/EP2019/062460.

Nov. 1, 2018 Search Report issued in British Patent Application No. GB1807830.3.

* cited by examiner

LASER BEAM SCANNER

FIELD OF INVENTION

This invention concerns a laser beam scanner and, in particular, but not exclusively, a laser beam scanner for an additive manufacturing (AM) apparatus, such as a powder bed additive manufacturing apparatus. The invention also concerns optics for the laser beam scanner, including a multi-laser beam optics, and methods of manufacturing the same.

BACKGROUND

In powder bed additive manufacturing objects are produced through layer-by-layer solidification of powder material. There are various methods of powder bed additive manufacturing, including selective laser melting (SLM) and selective laser sintering (SLS).

In selective laser melting, a powder layer, such as a metal powder layer, is deposited on a powder bed in a build chamber and a scanner scans a laser beam across portions of the powder layer that correspond to a cross-section (slice) of the object being constructed. The laser beam melts the powder to form a solidified layer. After selective solidification of a layer, the powder bed is lowered by a layer thickness and a further layer of powder is spread over the surface and solidified, as required. Through this layer-by-layer process, one or more objects are formed.

A rate at which a laser based powder bed additive manufacturing process can proceed is limited by the difficulty of getting the laser power to the powder bed in an agile and accurate way. Complex scan paths require high bandwidth positioning performance from the beam positioning electro-mechanical systems and solid sections need a great deal of optical power delivered over a large area. The speed at which this can be achieved is a key determinant of the cost of AM components, the facility cost per hour of the machine being a large (often the largest) single contributor, above material costs and machine preparation.

Recently the rate has been increased significantly using multi-laser AM apparatus. Typically, these apparatus comprise a single build chamber with multiple beam delivery channels positioned above a single powder bed. Usually the areas these channels address are tiled with portions of overlap, although the example of Renishaw's RenAM™ 500Q has four lasers all addressing nominally the same powder bed. Each beam delivery channel comprises a laser source, two nominally orthogonal galvo-mirrors and a focusing mechanism in the form of dynamic focussing lenses such that the laser beams can be individually steered over the powder bed.

A disadvantage of multi-laser systems of this type is that each laser will require two galvo-mirrors and a focusing component. This is expensive, time-consuming to align, in need of regular servicing and sets a physical limit on the number of lasers which can be squeezed in to address the same area of powder (the most productive multi-laser arrangement) due to the physical size of the beam delivery channels.

U.S. Pat. No. 5,508,489 discloses a multiple beam laser sintering device including a sintering beam having a focal point at a powder bed and at least one defocussed laser beam incident on a region near the focal point of the focused beam. A focussing mirror provides a focussed beam to scanning mirrors. A defocussed beam passes through a hole in the mirror to the scanning mirrors. Instead of a focussing optic with a hole in it to allow the beam to pass through, a larger focussing optic may be used to reflect and focus both beams. Rather than splitting a laser beam to form the focussed and defocussed laser beams, two independent laser sources may be used.

US2003/0214571 A1 discloses exposure apparatus comprising a scanner including a plurality of exposure heads. Each exposure head includes a digital micromirror device (DMD). Arranged in order on a light incident side of the DMD are a fibre array light source including a laser outgoing portion in which outgoing end portions of the optical fibres are arranged in line, a lens system which corrects the laser beams emitted from the fibre array light source to condense the laser beams on to the DMD and a mirror which reflects the laser beams transmitted to the lens system to the DMD. Outgoing end portions of the optical fibres are sandwiched between two plates having a flat surface. A transparent protecting plate such as glass is placed on the light outgoing side of the optical fibre in order to protect the end face of the optical fibre.

US2015/0165556 A1 discloses a diode laser fibre array for use in direct metal laser melting. A plurality of cylindrical lenses are positioned between the diode lasers and a plurality of optical fibres to couple each diode laser to an optical fibre. The diode laser array may include lenses at the ends of the optical fibres or the ends of the optical fibres may be shaped to provide collimated or divergent laser beams.

US2016/0114427 discloses a device for laser-based generative component production. The device comprises a processing head for forming five laser spots in a laser line in a processing plane. The laser spots are in each case formed from fibre-coupled diode lasers, the radiation of which is guided via the optical fibres to optical focussing elements in the processing head and is focussed using the focussing elements onto the processing plane.

US2016/0279707 A1 discloses a laser printing system for additive manufacturing comprising at least two arrays of semiconductor lasers and at least one optical element, wherein the optical element is adapted to image laser light emitted by the laser arrays to a working plane.

SUMMARY OF INVENTION

According to a first aspect of the invention there is provided a laser beam scanner comprising a laser beams positioning optic, a plurality of optical fibres for delivering a plurality of laser beams and a fibre termination optic aligned to direct the laser beams from output ends of the plurality of optical fibres to the laser beams positioning optic, the laser beams positioning optic movable relative to the fibre termination optic to scan the laser beams across a working surface.

In this way, increased laser power is delivered by the laser beam scanner to the required area, ensuring a high-percentage on-time for the lasers, without the significant increase in costs associated with providing individual optical channels for each laser beam. In additive manufacturing, typically only a small fraction of a working surface, such as a surface of a powder bed, needs to be exposed to a laser beam in each layer such that, to maximise on-time for the laser beams, it is desirable to be able to direct the laser beams to multiple locations on the working surface. Scanning the laser beams by moving the laser beams positioning optic rather than all the optics of the optical channel allows one to achieve a rapid dynamic response.

Once the output ends of the optical fibres are aligned with the termination optic, alignment of the laser beams with the optical axis of other optical components of the laser scanner, such as the laser beams positioning optic can be achieved through alignment of the fibre termination optic with the optical axis. The termination optic may be connected to a holder for holding the output ends of the plurality of optical fibres. The holder may comprise a plurality of channels for receiving and aligning the output ends of the plurality of optical fibres with the termination optic. The termination optic may comprise a contoured surface forming a plurality of lenses for collimating and/or focussing each laser beam. The termination optic may be connected to the holder such that insertion of the optical fibres into the channels aligns the output ends of each optical fibre with a corresponding one of the lenses of the contoured surface. Alternatively, the termination optic may comprise a planar end surface (planar optic) through which the laser beams pass.

The termination optic and the holder may be formed from a unitary substrate. Alternatively, the termination optic and the holder may be separate parts (such as male and female parts) comprising locating formations that relatively locate the two parts when connected together. The holder and/or termination optic may be formed using a laser inscribing and chemical etching process, for example the process described in PCT/GB2018/050195.

The output ends of the optical fibres may be joined to the termination optic. The output ends of the optical fibres may be fused/welded to the termination optic. For example, the output ends of the optical fibres may be fused/welded to the termination optic by contacting the optical fibres with a surface of the termination optic and transmitting laser beams through the optical fibres to melt material at a contact interface between the optical fibres and the termination optic to fuse the fibre optics to the termination optic. Once the weld has cooled, the optical fibre is joined to the termination optic such that there is minimal energy loss (through reflection) at the interface between the two components. This is important in a laser beam scanner for steering high energy laser beams as even small losses at a component interface can result in significant heating of the components/laser beams scanner and subsequent distortion of the laser beam path.

The laser beams positioning optic may comprise at least one tiltable mirror, and preferably at least two tiltable mirrors, for directing the laser beams to different locations on the working surface. The laser beams positioning optic may comprise two tiltable mirrors tiltable about orthogonal axes. Alternatively or additionally, the laser beams positioning optic may comprise two tiltable mirrors tiltable about non-orthogonal axes, for example parallel axis. For example, one of the tiltable mirrors may have a faster dynamic response than the other tiltable mirror, for example as described in WO2016/156824.

The laser beam scanner may comprise a laser beam pattern adjustment optic for dynamically adjusting relative positions of the laser beams on the working surface. The laser beam pattern adjustment optic may comprise a plurality of individually displaceable portions, for example mirror portions, each displaceable portion arranged for steering one or a subset of the laser beams. In this way, displacement of the mirror portions can be used to adjust the relative positions of the laser beams on the working surface. Each portion of the laser beam pattern adjustment optic may be displaceable to subject the corresponding laser beam to relative small displacements on the working surface compared to greater displacements on the working surface of the pattern of laser beams achievable using the laser beams positioning optics, for example the tiltable mirror under the control of a galvanometer.

The laser beam scanner may comprise a focussing optic for focussing the laser beams. The focussing optic may be operable to maintain a focus of the laser beams in a working plane. The focussing optic may comprise an f-θ lens or at least one movable focussing lens dynamically adjustable with changes in position of the laser beams on the working plane.

The termination optic and output ends of the optical fibres may be arranged in a pattern such that the same pattern of laser beam spots can be achieved on the working surface for a plurality of different scanning directions. The output ends of the optical fibres may be arranged in a rotationally symmetric pattern about an optical axis of the laser beam scanner. The circular output ends of the optical fibres may be arranged in a triangular, hexagonal or square pattern (tiling). The rotational symmetry allows scanning of the laser beams in different scanning directions whilst maintaining the same spacing between tracks (hatches) formed by the laser beams.

The termination optic and output ends of the optical fibres may be rotatable about an optical axis of the laser beam scanner. This may allow for scanning in additional directions whilst maintaining the same spacing between tracks (hatches) formed by the laser beams and/or non-rotationally symmetric arrangements of the output ends of the optical fibres about the optical axis.

The laser beam scanner may comprise a controller for controlling movement of the laser beams positioning optic, the focussing optic and/or the termination optic. The controller may be arranged to control the laser beams positioning optic to scan the laser beams across the surface to form a set of first tracks with a first pass of the laser beams along the working surface and a set of second tracks with a second pass of the laser beams along the working surface, ones of the second tracks interspersed between ones of the first tracks.

The plurality of optical fibres may comprise between three and seven optical fibres.

According to a second aspect of the invention there is provided an additive manufacturing apparatus comprising a laser beam scanner according to the first aspect of the invention. An additive manufacturing apparatus builds an object in a layer-by-layer manner through selective solidification of layers of material.

The additive manufacturing apparatus may be a powder bed additive manufacturing apparatus comprising a movable platform for supporting a powder bed and the laser beam scanner is arranged to scan the laser beams across a surface of the powder bed.

The additive manufacturing apparatus may comprise a controller for controlling the laser beam scanner to scan the laser beams along tracks (hatches) that extend in different scanning directions for successive layers. The controller may be arranged to control lasers that generate the laser beams such that different sub-sets of the laser beams are used to form tracks extending in different scanning directions.

The additive manufacturing apparatus may comprise a plurality of lasers for generating the laser beams delivered to the laser beam scanner by the optical fibres, the plurality of lasers comprising different types of lasers for generating laser beams having different wavelengths and/or different pulse lengths. For example, the lasers may comprise a continuous wave laser (which may be modulated to generate laser pulses having a length of at least microseconds, 10s or even 100s of microseconds) for preheating and/or solidifying material and a pulsed laser, for example a nano-, pico- or femto-second laser, which may be used for ablating material.

According to a third aspect of the invention there is provided a method of fusing an optical fibre to an optical component comprising bringing an end of the optical fibre into contact with the optical component, passing a laser beam through the optical fibre, the laser beam having sufficient power to melt material at the interface between the end of the optical fibre and the optical component and allowing the melted material to cool to fuse the optical fibre to the optical component.

According to a fourth aspect of the invention there is provided a multi-laser beam delivery optic comprising a holder having therein a plurality of channels, each channel arranged for receiving an optical fibre, and a termination optic comprising a contoured surface forming a plurality of lenses, the termination optic connected to the holder, wherein each channel is aligned with a corresponding lens of the plurality of lenses to align an output end of an optical fibre inserted into the channel with the corresponding lens such that the corresponding lens collimates and/or focusses a laser beam delivered by the optical fibre.

The output ends of the optical fibre may be fused/welded to the termination optic. The termination optic may be integrally formed with the holder or the holder the termination optic may comprise separate pieces.

According to a fifth aspect of the invention there is provided a multi-laser beam optic comprising a plurality of mirror portions displaceable about a common pivot and, for each mirror portion, at least one actuator for driving displacement of the mirror portion.

The at least one actuator may comprise a piezoelectric actuator. The piezoelectric actuator may provide a limited stroke high frequency response. Each mirror portion may be displaceable about two, preferably orthogonal, axes by at least two spaced apart actuators. The mirror portions may be arranged around the common pivot, for example in a petal design.

DESCRIPTION OF EMBODIMENTS

Figure 1:
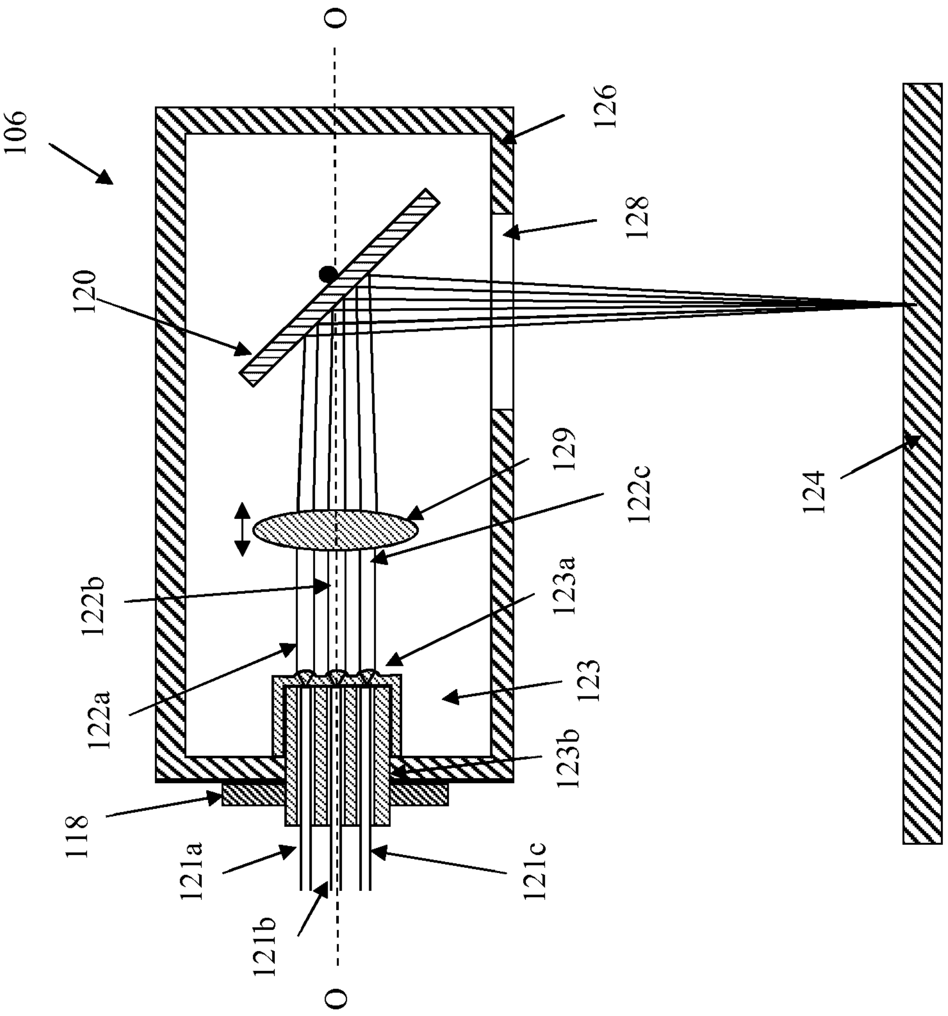
FIG. 1 is a cross-sectional view of a laser bean scanner according to an embodiment of the invention.
Figure 2:
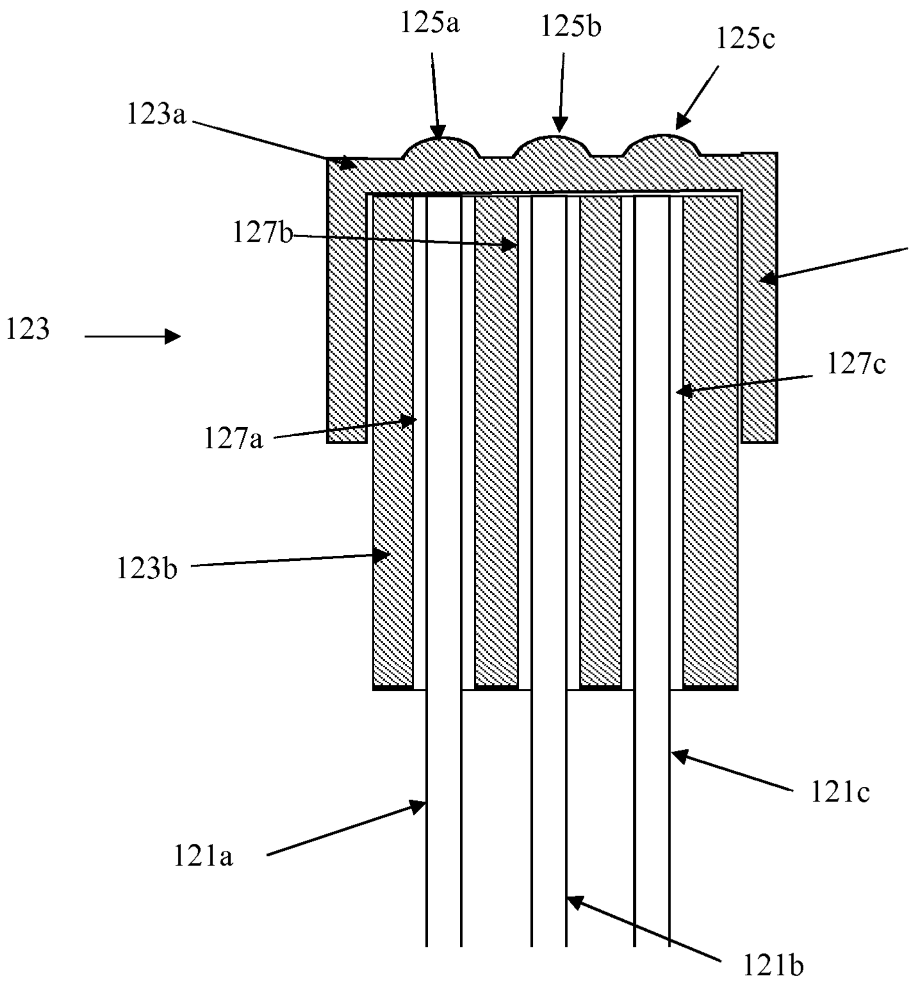
FIG. 2 is a cross-sectional view of an end cap for a plurality of optical fibres of the laser beam scanner shown in FIG. 1.
Figure 3:
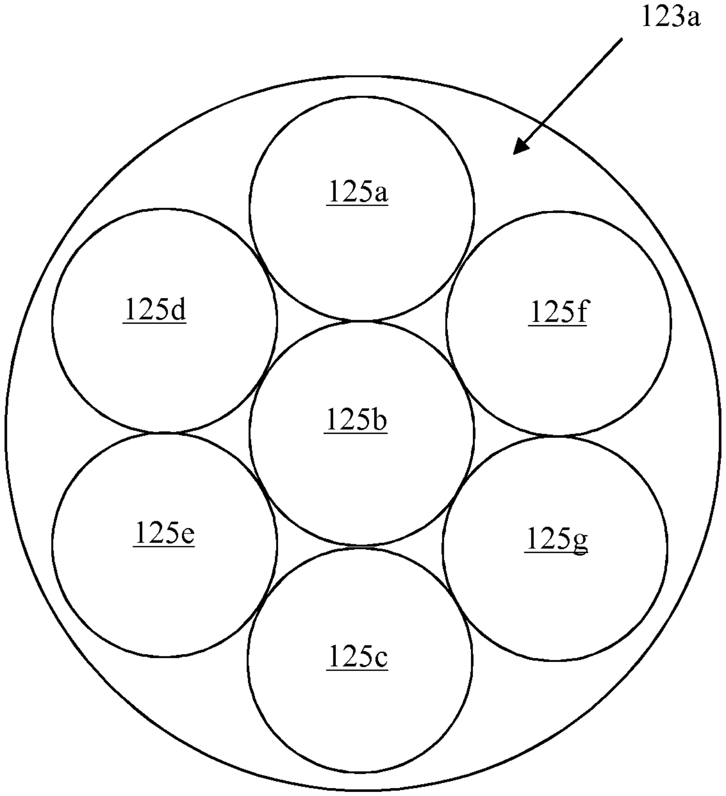
FIG. 3 is an end view of the termination optic of the end cap shown in FIG. 2.

Referring to FIGS. 1 to 3, a laser beam scanner 106 according to an embodiment of the invention comprises a laser beams positioning optic 120, a plurality of optical fibres (in this embodiment seven optical fibres but only three 121*a*, 121*b*, 121*c* are shown) for delivering a plurality of laser beams 122*a*, 122*b*, 122*c* and a unitary fibre termination optic 123*a* aligned to direct the laser beams 122*a*, 122*b*, 122*c* from output ends of the optical fibres 121*a*, 121*b*, 121*c* to the laser beams positioning optic 120. The laser beams positioning optic 120 is movable relative to the fibre termination optic 123*a* to scan the laser beams 122*a*, 122*b*, 122*c* across a working surface 124.

In this embodiment, the laser beams positioning optic 120 comprises a pair of tiltable mirrors (only one of which is shown) mounted to rotate about orthogonal axis such that movement of the mirrors scans the laser beams 122*a*, 122*b*, 122*c* across the working surface 124 in two-dimensions. The tiltable mirrors are driven by galvanometers (not shown) in response to drive signals from a controller. In a further embodiment, a further tiltable mirror is provided having a faster dynamic response than the galvanometer driven mirrors to increase a capability for rapid changes in direction in the two scanning directions. Such an arrangement of mirrors having different dynamic response is disclosed in more detail in WO2016/156824.

A dynamic focussing optic 129 is provided for maintaining a focus of the laser beams in the plane of the working surface 124 as the beams are steered across the working surface by the tiltable mirrors. In an alternative embodiment, the dynamic focussing optic may be replaced with an f-θ lens at an aperture 128 in housing 126 or in a chamber window (such as window 109 shown in FIG. 4) through which the laser beams are directed by the scanner 106.

The fibre termination optic 123*a* comprises a contoured surface, distal from the ends of the optical fibres, forming a plurality of lenses 125*a* to 125*g* for collimating each diverging laser beam after the laser beam leaves the output end of the corresponding optical fibre. The surface of the fibre termination optic proximal to the ends of the optical fibres is fused to optical fibres to minimise loss at the interface between the optical fibres and the termination optic 123*a*. Fusing of the optical fibres to the termination optic may be achieved by any suitable means, including transmitting laser beams through the optical fibres to melt material at a contact interface between the optical fibres and the termination optic 123*a*.

The termination optic 123*a* is connected to an optical fibre holder 123*b* to form a multi-laser delivery optic or end cap 123 for the output ends of the plurality of optical fibres. In this embodiment, the termination optic 123*a* comprises a female sleeve portion 119 for receiving the cylindrical male holder 123*b* to connect the termination optic 123*a* to the holder 123*b*. The holder 123*b* is an interference fit within the sleeve 126.

The optical fibre holder 123*b* comprises a channel 127*a*, 127*b*, 127*c* for each optical fibre 121*a*, 121*b*, 121*c*. Insertion of an optical fibre into each channel 127*a*, 127*b*, 127*c* aligns an output end of the optical fibre with a corresponding lens 125*a* to 125*g* on the termination optic 123*a*. Once aligned using the holder 123*b*, the optical ends can be fused to the termination optic 123*a*.

In another embodiment, the termination optic 123*a* is formed as a single-piece together with the holder 123*b*.

The holder 123*b* and the termination optic 123*a* are formed using a laser inscribing and chemical etching process, for example the process described in PCT/GB2018/050195.

The end cap 123 is mounted to the housing 126 of the laser scanner 106 by a flexure 118 that allows adjustment of a position of the end cap 123 relative to the positioning and focussing optics 120 and 129. In this way, the collimated laser beams output from the end cap 123 can be aligned together with the optic axis O—O of the optical channel provided by the laser scanner 106.

Figure 4:
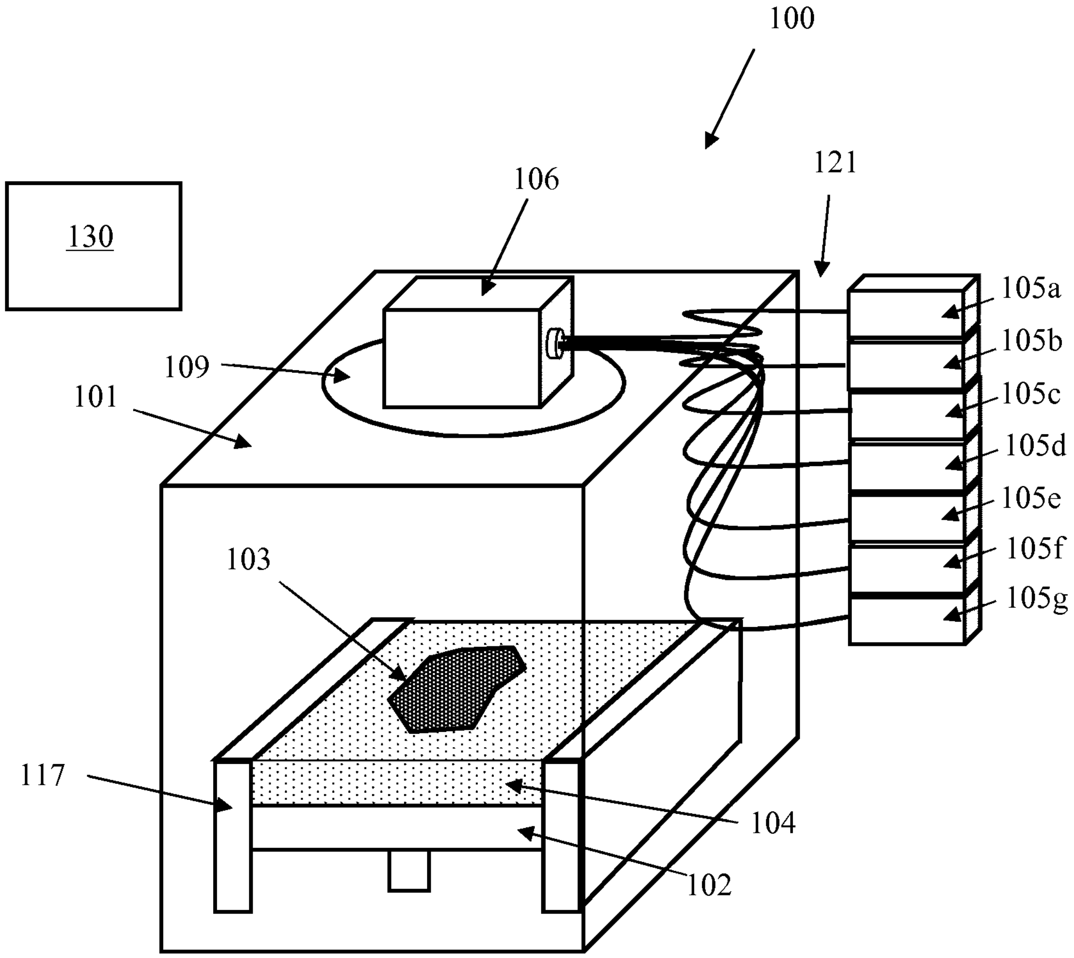
FIG. 4 is a schematic view of a powder bed additive manufacturing apparatus according to an embodiment of the invention.

The laser scanner can be used in an additive manufacturing apparatus 100. FIG. 4 shows the laser scanner 106 as part of a powder bed additive manufacturing apparatus 100. A plurality of lasers 105*a* to 105*g* are connected to the optical scanner 106 via optical fibres (designated generally as 121). The additive manufacturing apparatus comprises a build chamber 101 having an optical window 109 therein, wherein the laser scanner 106 is mounted to deliver the laser beams to a powder bed 104 in the build chamber 101 through the optical window 109. The powder bed 104 is supported by a build platform 102 lowerable within a build sleeve 117. As the build platform 102 is lowered, powder layers are formed across the powder bed 104 using a wiper and dispensing mechanism (now shown). The laser scanner 106 scans the laser beams across each powder layer to solidify the powder material to form the object 103. Operation of the laser scanner 106 and lasers 105*a* to 105*g* is under the control of a controller 130. The controller 130 may control the laser scanner 106 and lasers 105*a* to 105*g* to carry out scanning strategies as described hereinafter.

Figure 5A:
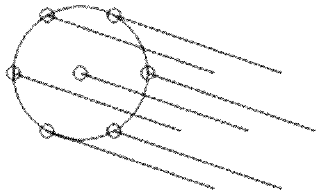
FIGS. 5*a* to 5*d* illustrate single-pass scanning methods for forming a series of equally spaced parallel tracks (hatches) on a working surface with different laser beam configurations (patterns) according to embodiments of the invention.
Figure 7A:
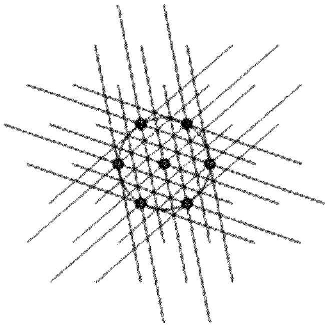
FIGS. 7*a* to 7*d* illustrate multi-directional scanning capabilities of the laser beam configurations shown in FIGS. 5*a* to 5*d* for forming a series of equally spaced parallel tracks (hatches) on a working surface.
Figure 7B:
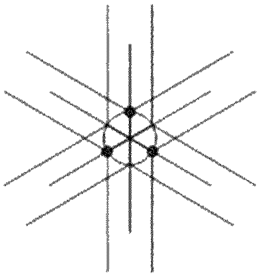
Figure 7C:
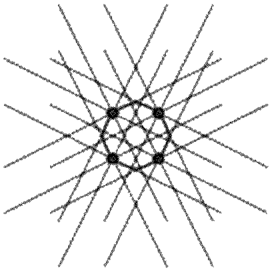
Figure 7D:
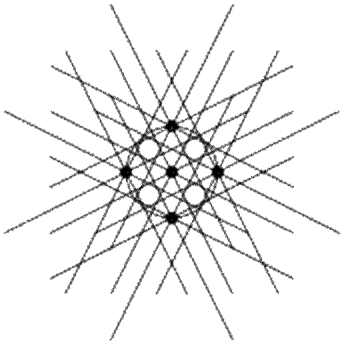

Referring to FIG. 5*a*, the laser scanner may scan the seven laser beams across each layer to simultaneously form a plurality of tracks (hatches) equally spaced across the powder layer. The rotational symmetry of the laser beam pattern means that simultaneous formation of equally spaced tracks can be achieved for several different scan directions, as shown in FIG. 7*a*. Varying a scanning direction between layers can be advantageous in minimising directional properties in the eventual object that is manufactured. FIG. 7*a* shows 6 possible scanning directions for the configuration of seven lasers. However, other requirements may constrain the selection of the scanning direction to a subset of these possible scanning directions, for example if the scanning is to be in a direction opposed to a gas flow across the powder bed, as disclosed in WO2014/125280 and WO2014/125258.

FIGS. 5*b* to 5*d* and 7*b* to 7*d* show tracks formed using configurations (patterns) of laser beam spots on the surface of the powder bed with a laser scanner delivering between three and five lasers beams. Configuration 5*b*, like configuration 5*a*, provides six possible hatching directions with equally spaced tracks at 60° intervals, whereas configurations 5*c* and 5*d* provide eight possible hatching directions with equally spaced tracks at 45° intervals. For each configuration, each laser spot in the pattern is at a different offset in the scanning direction (along the length of the track). This offset can be accounted for to ensure that each track has the correct start and end points through control of the laser firing sequence. This may result in not all the lasers 105*a* to 105*g* being fired at the start and the end of a scan of the laser pattern along a scan line across the powder bed 104.

Figure 5B:
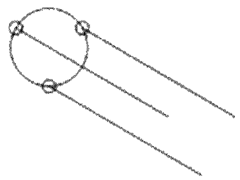
Figure 6:
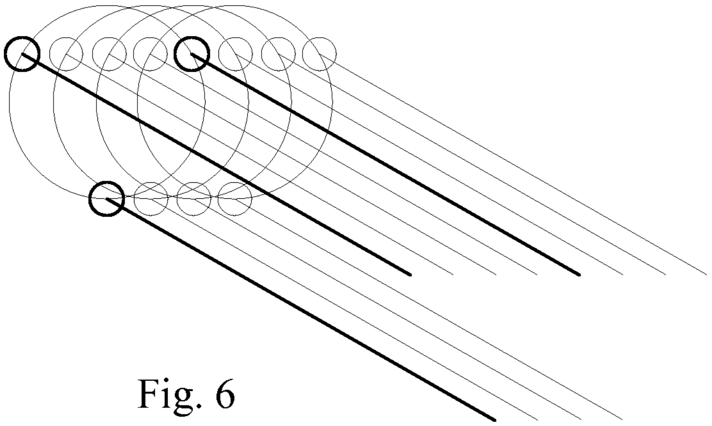
FIG. 6 illustrates a multi-pass scanning method for forming a series of equally spaced parallel tracks (hatches) on a working surface using the laser beam configuration shown in FIG. 5*b;*

Should the spacing between the simultaneously formed tracks be wider than that required to form continuously solidified material between adjacent tracks, the gaps of unsolidified material can be later solidified by one or more further passes of the pattern of laser beams along one or more scan lines having a small offset (less than a width of the laser pattern perpendicular to the scan direction) from each other. FIG. 6 shows such a scan strategy for the laser configuration shown in FIG. 5*b*, wherein four passes of the laser beam pattern give a laser track pitch ¼ of the laser track width provided by a single pass of the laser pattern such that material is continuously solidified between the first three tracks formed on the first pass (shown in bold lines). The number of passes will be different for different patterns of the laser beams and potentially, for different scan parameters, such as laser power, scan speed, (or for a point scanning regime as used in Renishaw's RenAM 500M) exposure time and/or point distance. Each successive pass may be in an opposed direction.

Figure 5C:
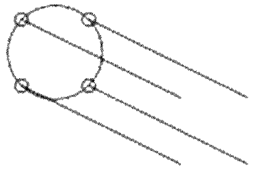
Figure 5D:
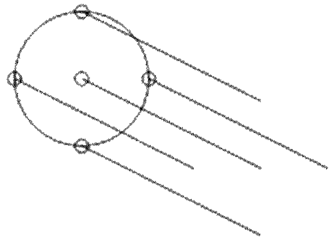
Figure 8A:
FIGS. 8*a* to 8*c* illustrates a method of forming a series of equally spaced parallel tracks (hatches) on a working surface achievable using a subset of the total available laser beams.
Figure 8B:
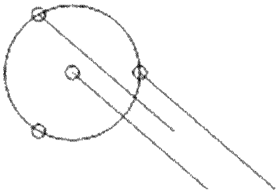
Figure 8C:
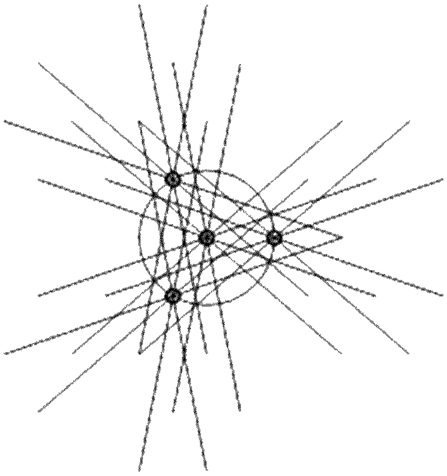

The scanning strategies described above are predicated on firing all lasers during a pass of the laser beam pattern over an area of the powder bed to be solidified. This provides an efficient use of the laser resources. However, a wider possible set of scanning directions is possible if the requirement to use all lasers during a scan is relaxed. An example is shown in FIGS. 8*a* to 8*c*. In this example, the laser spot pattern of FIG. 5*c* is used. The tracks made in FIG. 8*a* are uniformly spaced, but if all four lasers are fired, there would be a greater gap between the tracks formed by the laser spot in the centre and the laser spot on the righthand side than that between the adjacent tracks formed by the other laser spots. Accordingly, to keep the track spacing equal, the laser for the righthand spot is not fired when scanning in a direction shown in in FIG. 8*a*. However, for a different scanning direction, such as that shown in FIG. 8*b*, the laser for the righthand laser spot is fired, whereas a different one of the lasers is not fired in order to form tracks of equal spacing. By selecting which laser not to fire for each scanning direction, equally spaced tracks can be formed for a greater variety of scanning directions, as shown in FIG. 8*c*.

In a further embodiment, different types of lasers may be used for ones of the laser spots. This may be advantageous if the laser scanner 106 is to be used for different purposes during the build, for example for preheating, sintering, melting, laser peening, laser ablation or in-process monitoring. Furthermore, the laser pattern may be moved in a direction such that one laser spot may be used for preheating of the powder material and another of the laser spots used for the solidification of the material. For this purpose, the laser pattern may be scanned in a direction such that the tracks of two laser spots are along the same line (or at least overlap) but with one laser spot following the other along that line. Such a scanning strategy may be achievable with the laser spot configuration shown in FIG. 5*c* with simultaneously utilisation of all the laser beams and for the laser spot configurations shown in FIGS. 5*a*, 5*b* and 5*d* with one of the lasers not being fired. A laser used for preheating may be operated at a lower power than a laser used for solidification. In a further embodiment, the preheating of the powder may be sufficient to sinter the powder, the sintered powder later melted with another of the laser spots on a single pass of the laser beam spot pattern. For different scanning directions, different laser beam spots may be used for preheating/sintering and solidification of the powder.

Figure 9:
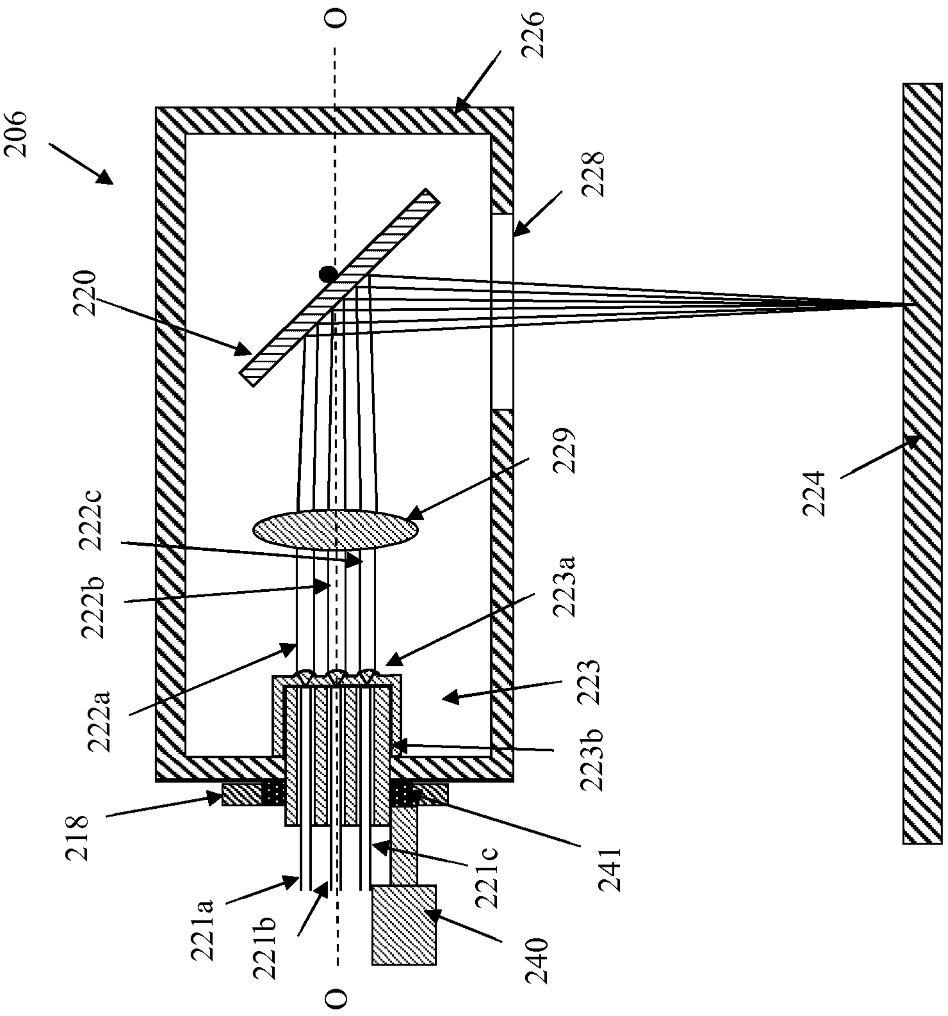
FIG. 9 is a cross-sectional view of a laser bean scanner according to another embodiment of the invention.

A further embodiment of a laser scanner 206 according to the invention is shown in FIG. 9. Features of this embodiment corresponding to features described above with reference to FIGS. 1 to 3 have been given the same reference numerals but in the series 200. Features of this embodiment that are the same or similar to features of the above described embodiment will not be described again and reference is made to the above description for these features. This embodiment differs from the embodiment shown in FIG. 1 in that the end cap 223 is mounted for rotation about the optical axis O—O. To this end, bearings 241 are provided to allow for rotation of the end cap 223 in the flexure 225 and a drive mechanism 240 is provided for driving rotation of the end cap 223. The end cap 223 may be rotatable (for example, through a set of angles between 0° and 60° for the laser beam patterns shown in FIGS. 5*a* and 5*b* and through a set of angles between 0° and 45° for the laser beam patterns shown in FIGS. 5*c* and 5*d*) to increase the number of scanning directions in which equally spaced tracks can be simultaneously formed using a rotationally symmetric pattern of laser beams. Alternatively, a non-rotationally symmetric pattern of laser beams may be provided by the end cap 223 and the end cap 223 is rotated to align the laser pattern with a scanning direction for each layer. In this alternative embodiment, the end cap 223 may be rotatable through a set of angles between 0° and 360°. Rotation of the end cap 223 may only be necessary at the start/end of a layer as, once the end cap is aligned with a scanning direction for that layer, all tracks may be formed using that orientation of the end cap 223.

The laser scanner may be used for continuous scanning in which the pattern of laser spots is moved across the working surface 124, 224 with the lasers switched on or may be used for point scanning, wherein the laser beam pattern is held at a location on the working surface for an exposure time and then moved to a new exposure point. During the movement (or "hop") to the new location the laser beams may be switched-off. In this way a series of discreet points are exposed rather than a continuous line, although the solidified regions formed by the exposure of discreet points may form a line of continuously solidified material. A laser beam scanner having a triangular tiled pattern of laser beams, as shown in FIGS. 5*a* and 5*b*, may be used for a scanning strategy in which the discreet exposure points are distributed in a triangular pattern, as described in WO2016/079496. Exposure of points in a triangular pattern may be used in a multi-layer consolidation strategy in which spaced apart "columns" of material extending across multiple layers are consolidated through exposure of a single layer and unconsolidated material between these columns is consolidated through exposure of later layers, for example as disclosed in unpublished application GB 1803510.5, which is incorporated herein by reference.

Figure 10:
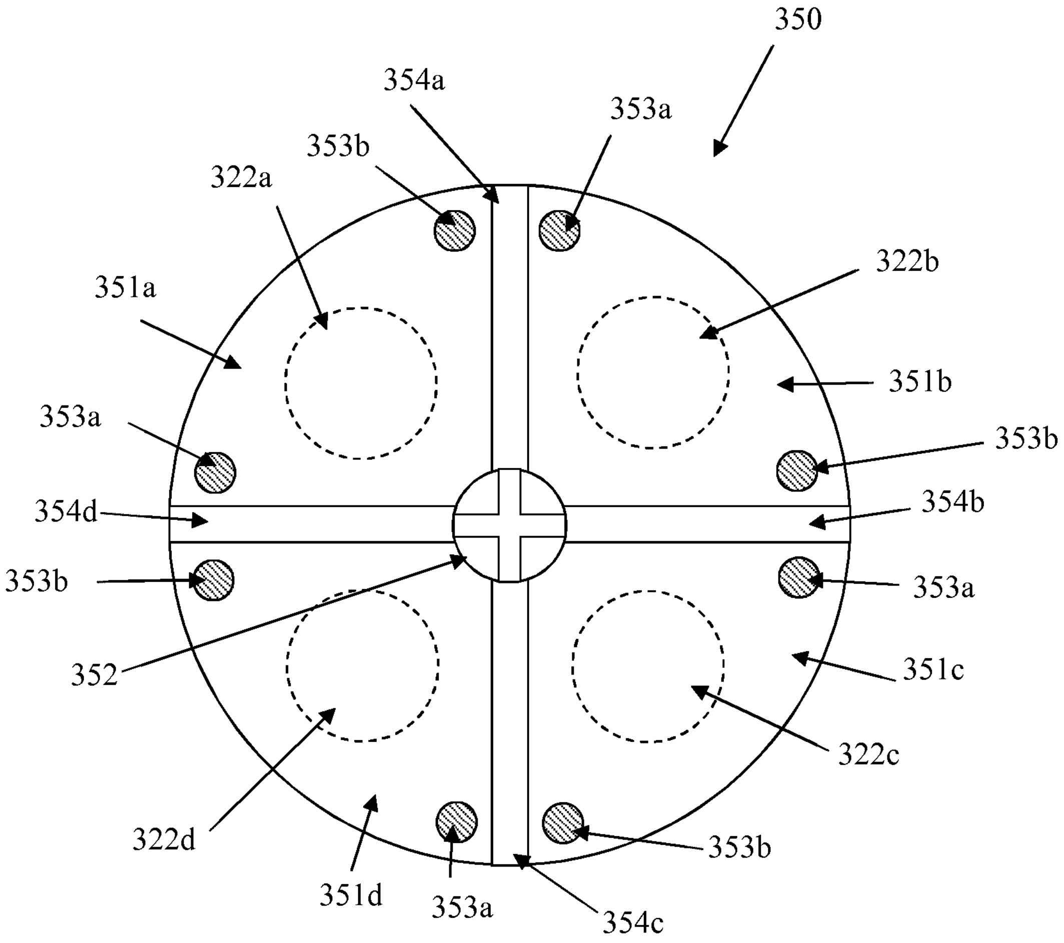
FIG. 10 shows a laser beam pattern adjustment optic according to an embodiment of the invention.

Referring to FIG. 10, in a further embodiment, the relative position of the laser spots on the working surface can be dynamically changed by the laser scanner using laser beam pattern adjustment optic 350 provided in the optical path of the laser beams. The optic 350 comprises a plurality of individually displaceable portions, in this embodiment in the form of four mirror quadrants 351*a* to 351*d*. Each mirror quadrant 351*a* to 351*d* is pivotably about a central pivot 352 comprising a torsion spring for each mirror quadrant 351*a* to 351, which biases the mirror quadrant 351*a*, 351*b*, 351*c*, 351*d* against displacement driven by actuators 353*a*, 353*b*. In this embodiment, each mirror quadrant 351*a* to 351*d* comprises two actuators 353*a*, 353*b*, one at each outer corner of the quadrant 351*a* to 351*d*. The actuators 353*a*, 353*b* are in the form of piezoelectric stacks that can produce small displacements of the mirror quadrants at high drive frequencies (typically of around 1 mm or less at the working surface compared to hundreds of millimetres of displacement achievable with the main beam positioning optics 120, 220). Between each pair of mirror quadrants 351*a* to 351*d* is a flexible film 354*a* to 345*d* for allowing small relative displacements between the mirror quadrants 351*a* to 351*d*. The laser beam pattern adjustment optic 350 is located within the laser scanner such that a different one of the laser beams 322*a* to 322*d* delivered along the optical channel impinges on a different one of the mirror quadrants 351*a* to 351*d*. The laser beam pattern adjustment optic 350 may be located between the termination optic and the galvanometer driven tiltable mirrors for steering of the laser beams pattern across the working surface. The laser beam pattern adjustment optic 350 may be at a location along the optical axis where the laser beams are collimated, for example between the termination optic 123*a* and the focussing optic 129.

In this embodiment, a laser beam pattern adjustment optic 350 with four quadrant mirrors is described for steering a pattern consisting of four laser beams. However, it will be understood that a different number of mirror portions may be required for a laser beam pattern comprising a different number of laser beams. In such embodiments, each mirror portion may not be quadrant shaped but may have a shape that is a different circular sector, such as a 120° sector, sextant or octant.

The beam pattern adjustment optic 350 may be used for several purposes during scanning of the overall laser beam pattern with the positioning optic 120, 220.

It may be desirable to alter the relative positions of the laser beam spots to obtain the desired spacing between tracks when scanning in a particular scanning direction. The ability to alter the relative positions of the laser beam spots in the pattern may increase the number of scanning directions available for forming tracks with a set spacing.

Figure 11:
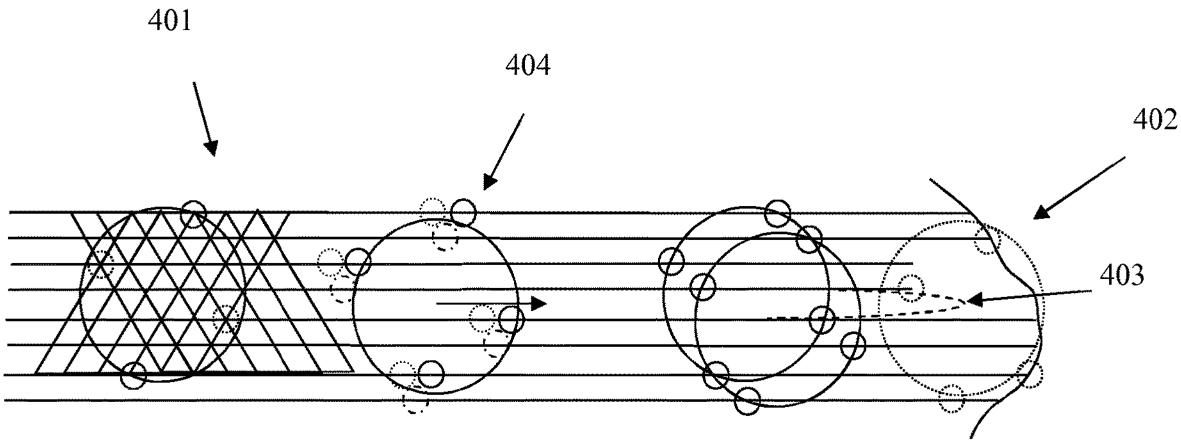
FIG. 11 illustrates scanning strategies achievable with the laser beam pattern positioning optic shown in FIG. 10.

Furthermore, it may be desirable to dynamically change the relative positions of the laser beams in the pattern to achieve a desired distribution of exposure points that would not be achievable by stepping a fixed pattern of the laser beams across the working surface. For example, at 401 in FIG. 11 a pattern of four laser beams are scanned along tracks to achieve a triangular pattern of exposure points. To achieve this, the laser spots are slightly displaced using the laser beam pattern positioning optic 350 from the square array of spots shown in FIG. 5*c*, with certain ones of the laser spots being held at a point on the working surface whilst other ones of the spots are hopped between adjacent spot along the corresponding track. The holding of the spot at a point on the working surface and subsequent hopping to the adjacent point may be achieved using the technique described in WO2016/156824, which is incorporated herein by reference, in particular, with reference to FIGS. 4*a* and 4*b* of WO2016/156824. In FIG. 11, the spots in dotted lines are shown in a position displaced from the "neutral" (unbiased) position on the circumference of the circle. The two triangles included in FIG. 11 are to illustrate that when some spots of the pattern in the neutral position coincide with a point exposure on the surface for a triangular pattern of point exposures other ones of the laser spots, when in the "neutral" position, will be spaced from an exposure point hence the need for a small displacement of the laser spot from the "neutral" position through actuation of the corresponding mirror quadrant. In this way, point exposure patterns are achievable on the working surface that are not multiples of the image of the laser beams provided by the end cap 123, 223.

Individual control of the position of the laser beam spots may allow the laser spots to be hopped at different times onto an adjacent track to be scanned on a further pass of the laser beam pattern over the working surface as shown at 402 in FIG. 11. This may allow the laser beam pattern to be turned around at the edge of an area to be solidified whilst material continues to be solidified (as opposed to Skywriting wherein the lasers beam is switched off during a turn to avoid defects that can result from melting during deceleration and acceleration of the galvanometer steering mirrors). Each laser beam can be hopped to the next exposure point at the required time using the faster dynamic response of mirror 350 even if the "neutral" position of the laser spot has yet to reach that exposure point. As shown in FIG. 11, due to the offset nature of the laser beam spots in the pattern, "early" turning of the laser beam pattern at the edge of the area (indicated by dotted line 403) to minimise non-firing times of the laser beams may result in some tracks not extending to the edge of the area to be solidified as the edge of the area is not within the range of the corresponding laser beam. These unsolidified areas may be later filled in when carrying out a border scan of the area.

In a further scanning strategy shown at 404, the pattern is located such that the "neutral" position for the laser spots falls between tracks of exposure points and the laser beam pattern adjustment optic 350 is used to hop the laser spots between exposure points on adjacent tracks (as shown by the dashed, dashed and dotted and solid line spots) as the pattern is progressed in a scanning direction. In this way, adjacent tracks of exposure points may be solidified in a single pass of the laser beam pattern.

Figure 12:
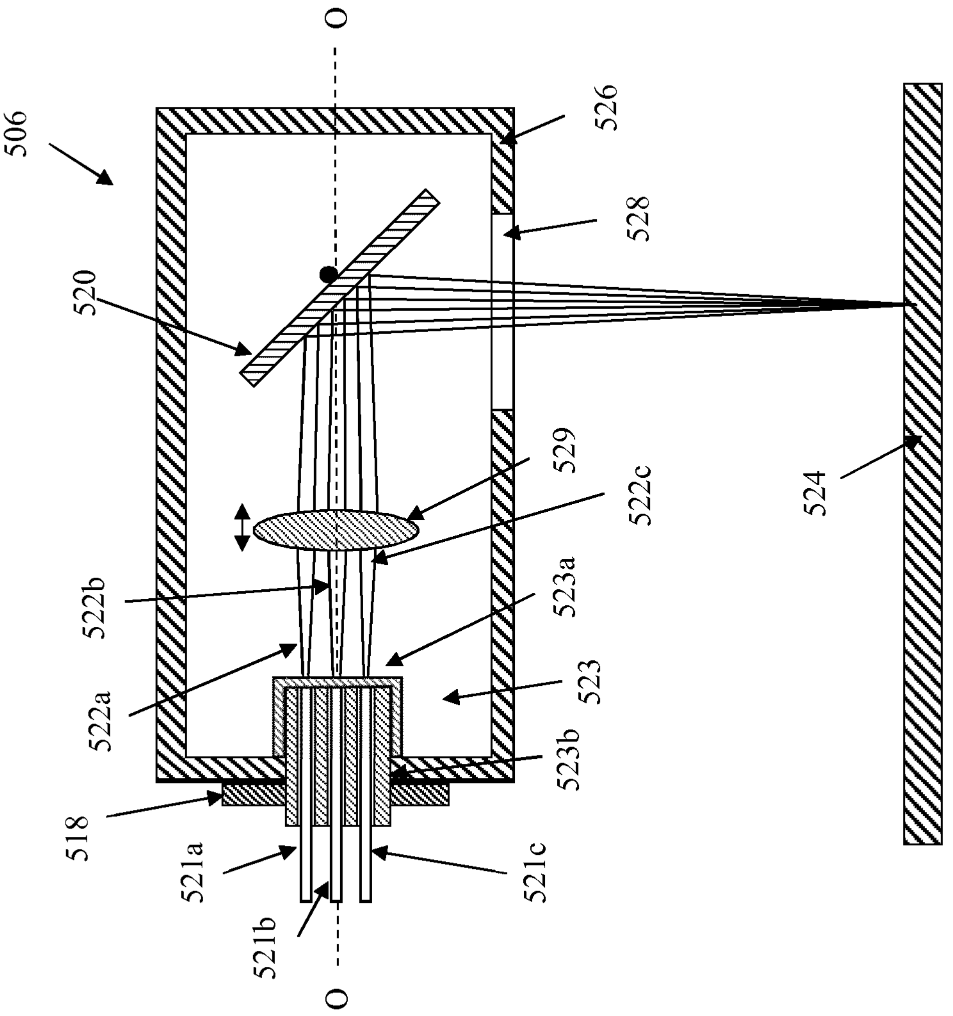
FIG. 12 is a cross-sectional view of a laser beam scanner according to another embodiment of the invention.

FIG. 12, shows another embodiment of a laser scanner according to an embodiment of the invention. Features of this embodiment corresponding to features described above with reference to FIGS. 1 to 3 have been given the same reference numerals but in the series 500. Features of this embodiment that are the same or similar to features of the above described embodiment will not be described again and reference is made to the above description for these features. This embodiment differs from the embodiment shown in FIG. 1 in that the termination optic 523*a* presents to each optical fibre 521*a*, 521*b*, 521*c* planar proximal and distal faces transverse (perpendicular) to a propagation direction of the laser beam delivered through the optical fibre 521*a*, 521*b*, 521*c*. Accordingly, the laser beams 522*a*, 522*b*, 522*c* from the optical fibres 521*a*, 521*b*, 521*c* are not collimated at the termination optic 523*a* but continue to diverge until reaching the focussing optic 520.

An alternative method for forming the end cap comprises stripping the outer coating off ends of a set of optical fibres and then bundling the bare glass fibre ends into a required pattern, such as those described above with reference to FIGS. 5*a* to 5*d*, using a jig to form a fibre array. In the case of a fibre array of seven optical fibres, the optical fibres can be stacked in a hexagonal pattern, whereas for the other patterns, appropriate spacers are provided. The fibre array is fed into a glass capillary having an appropriate inner diameter. An inner diameter of the glass capillary may taper outwardly at an insertion end to facilitate insertion of the optical fibre ends into the glass capillary. Heat is then applied, for example using a $CO_2$ laser or $H_2$ flame, to the glass capillary to shrink the capillary around the array of fibre ends. An end of the capillary and array of fibre ends is then cleaved or otherwise cut to provide a planar end face of optical fibres and capillary, which is fused to a termination optic, such as described above, using, for example, an electric arc, $CO_2$ laser or $H_2$ flame. The planar end face may be polished before being fused to the termination optic.

In a further embodiment, a multi-core fibre is formed having the required pattern of optical fibre cores and this multi-core fibre is fused to a termination optic. Lasers can be fed to the multi-core optical fibre by using free-space optics, although this may be expensive and require careful alignment during production, or spliced to a fan-out optic, which splits the multi-core fibre into individual optical fibres. The fan out optic may be manufactured by forming an appropriate end cap for the delivery end of the multi-core fibre. The end cap may be similar to the end cap described with respect to FIG. 12, with the multi-core fibre fused to an opposite side of a central termination optic such that the laser beams pass from the individual optical fibres into the multi-core fibre via the central termination optic. Alignment of the individual optical fibres with the multicore fibre may be achieved through the formation of appropriately positioned channels either side of the termination optic. The end cap may be formed using laser inscribing and chemical etching or through the above described method of shrinking a glass capillary tube around the fibres.

It will be understood that alterations and modifications to the above described embodiments can be made without departing from the scope of the invention as defined herein. For example, use of the laser scanner is not limited to additive manufacturing apparatus but the laser scanner may be used with other apparatus, such as laser marking apparatus.

The invention claimed is:

1. An additive manufacturing method comprising controlling a laser beam scanner to scan a plurality of laser spots across a powder bed, the laser beam scanner comprising:

a laser beams positioning optic;

a plurality of optical fibres for delivering a plurality of laser beams; and a fibre termination optic, output ends of the plurality of optical fibres being joined to the fibre termination optic to direct the laser beams from output ends of the plurality of optical fibres to the laser beams positioning optic, the laser beams positioning optic movable relative to the fibre termination optic to scan the plurality of laser beams across a working surface of the powder bed, wherein:

all of the output ends joined to the fibre termination optic are arranged in a pattern that is rotationally symmetric about an optical axis of the laser beam scanner with an order of rotational symmetry greater than two; and when all the plurality of laser beams are simultaneously generated, the laser beams form a pattern of laser spots on the working surface corresponding to the pattern of output ends, the laser spots being spaced apart so as not to overlap, and the method comprising:

selecting a scanning direction from a plurality of different, non-parallel scanning directions, each different scanning direction resulting in equally spaced parallel tracks formed on the working surface, each of the laser spots forming a separate one of the parallel tracks, and a spacing between the equally spaced parallel tracks being the same for the different scanning directions;

simultaneously generating the plurality of laser beams to form the pattern of the laser spots on the working surface; and controlling the laser beam scanner to scan the pattern of laser spots across the working surface in the scanning direction selected from the plurality of different, non-parallel scanning directions, and controlling the laser beam scanner to scan the pattern of laser spots in a different one of the different, non-parallel scanning directions for successive lavers.

2. The additive manufacturing method according to claim 1, wherein the different, non-parallel scanning directions are opposed to a gas flow across the powder bed.

3. The additive manufacturing method according to claim 1, comprising controlling the laser beam scanner to scan the pattern of laser spots across the working surface to form a set of first tracks with a first pass of the pattern of laser spots over the working surface and a set of second tracks with a second pass of the pattern of laser spots over the working surface, wherein ones of the second tracks are interspersed between ones of the first tracks.

4. An additive manufacturing apparatus comprising:

a plurality of lasers for generating a plurality of laser beams;

a build chamber for containing a powder bed; and a laser beam scanner comprising:

a laser beams positioning optic;

a plurality of optical fibres for delivering the plurality of laser beams; and a fibre termination optic, output ends of the plurality of optical fibres being joined to the fibre termination optic to direct the plurality of laser beams from output ends of the plurality of optical fibres to the laser beams positioning optic, the laser beams positioning optic being movable relative to the fibre termination optic to scan the plurality of laser beams across a working surface of the powder bed, wherein:

all of the output ends joined to the fibre termination optic are arranged in a pattern that is rotationally symmetric about an optical axis of the laser beam scanner with an order of rotational symmetry greater than two;

when all the plurality of laser beams are simultaneously generated, the laser beams form a pattern of laser spots on the working surface corresponding to the pattern of output ends, the laser spots being spaced apart so as not to overlap; and the apparatus further comprises a controller configured to carry out the additive manufacturing method according to claim 1.

* * * * *